US009213444B2

(12) United States Patent
Chou et al.

(10) Patent No.: US 9,213,444 B2
(45) Date of Patent: Dec. 15, 2015

(54) TOUCH DEVICE AND TOUCH PROJECTION SYSTEM USING THE SAME

(75) Inventors: Hung-Chih Chou, Hsinchu (TW); Yung-Hsing Chen, Hsinchu (TW); Chien-Jung Huang, Hsinchu (TW); Chih-Hsien Tsai, Hsinchu (TW); Wei-Szu Lin, Hsinchu (TW)

(73) Assignee: Young Optics Inc., Hsinchu (TW)

( * ) Notice: Subject to any disclaimer, the term of this patent is extended or adjusted under 35 U.S.C. 154(b) by 82 days.

(21) Appl. No.: 13/587,894

(22) Filed: Aug. 16, 2012

(65) Prior Publication Data

US 2013/0265245 A1   Oct. 10, 2013

(30) Foreign Application Priority Data

Apr. 10, 2012   (TW) ............................... 101112644 A (51) Int. Cl.
*G06F 3/042* (2006.01)
(52) U.S. Cl.
CPC .................................... *G06F 3/0421* (2013.01)
(58) Field of Classification Search
CPC ....... G06F 3/042; G06F 3/041; G06F 3/0421; G06F 3/0425; G06F 3/0412; G06F 2203/04109; G03B 21/00; G03B 21/10
See application file for complete search history.

(56) References Cited

U.S. PATENT DOCUMENTS

| | | | | |
|---|---|---|---|---|
| 5,360,659 | A * | 11/1994 | Arends et al. ................. | 428/216 |
| 7,054,063 | B2 | 5/2006 | Shimoda | |
| 8,344,311 | B2 * | 1/2013 | Tanaka ........................... | 250/221 |
| 8,619,062 | B2 * | 12/2013 | Powell et al. .................. | 345/175 |
| 8,896,576 | B2 | 11/2014 | Miyazaki et al. | |
| 2006/0180886 | A1 * | 8/2006 | Tsang ............................. | 257/432 |
| 2006/0227120 | A1 * | 10/2006 | Eikman ......................... | 345/175 |
| 2007/0285786 | A1 * | 12/2007 | Ho et al. ........................ | 359/599 |
| 2008/0029691 | A1 * | 2/2008 | Han ............................... | 250/224 |
| 2008/0179507 | A2 | 7/2008 | Han | |
| 2008/0284925 | A1 * | 11/2008 | Han ................................ | 349/12 |
| 2009/0267919 | A1 * | 10/2009 | Chao et al. .................... | 345/175 |
| 2010/0001963 | A1 * | 1/2010 | Doray et al. ................... | 345/173 |
| 2010/0302185 | A1 * | 12/2010 | Han et al. ...................... | 345/173 |
| 2010/0302210 | A1 | 12/2010 | Han et al. | |
| 2011/0291993 | A1 | 12/2011 | Miyazaki et al. | |
| 2012/0146948 | A1 * | 6/2012 | Tong et al. ..................... | 345/175 |
| 2012/0182266 | A1 * | 7/2012 | Han ................................ | 345/175 |
| 2013/0038567 | A1 * | 2/2013 | Chen .............................. | 345/174 |
| 2013/0234990 | A1 * | 9/2013 | Wang et al. ................... | 345/175 |

FOREIGN PATENT DOCUMENTS

| | | |
|---|---|---|
| CN | 101821703 | 9/2010 |
| CN | 102308267 | 1/2012 |
| JP | 2009545828 | 12/2009 |

(Continued)

*Primary Examiner* — Dwayne Bost
*Assistant Examiner* — Ivelisse Martinez Quiles
(74) *Attorney, Agent, or Firm* — Jianq Chyun IP Office (57) ABSTRACT

A touch device including a light guide unit, a light emitting unit, an invisible light filter and an invisible light detector is provided. The light guide unit has at least one light incident surface and a first surface connected to the light incident surface. The light emitting unit is disposed beside the light incident surface and is capable of emitting an invisible light beam. The invisible light filter is contacted tightly with the first surface. The light guide unit is disposed between the invisible light filter and the invisible light detector. Moreover, a touch projection system including the touch device is also provided.

15 Claims, 10 Drawing Sheets

(56) References Cited

FOREIGN PATENT DOCUMENTS

| | | |
|---|---|---|
| JP | 2011527478 | 10/2011 |
| TW | 201202770 | 1/2012 |
| WO | 2009020940 | 2/2009 |
| WO | 2009110284 | 9/2009 |

* cited by examiner

TOUCH DEVICE AND TOUCH PROJECTION SYSTEM USING THE SAME

CROSS-REFERENCE TO RELATED APPLICATION

This application claims the priority benefit of Taiwan application serial no. 101112644, filed on Apr. 10, 2012. The entirety of the above-mentioned patent application is hereby incorporated by reference herein and made a part of this specification.

TECHNICAL FIELD

The invention relates to a touch device and a touch projection device and particularly relates to an optical touch device and an optical touch projection system.

BACKGROUND

An electronic product including a touch device is characterized as being easy to use. Therefore, the touch device has become an important unit of the electronic product. Categorizing by operating principles, the known touch devices can be categorized into capacitive, resistive, and optical touch devices. Taking optical touch devices as an example, a conventional optical touch device includes a light emitting unit, a light guide plate, and an infrared light image capturing device. When a user does not touch the optical touch device, an infrared light beam emitted by the light emitting unit is confined in the light guide plate, and the infrared light image capturing device does not detect the infrared light beam emitted from the light emitting unit. When the user touches the optical touch device, a total internal reflection of the infrared light beam in the light guide plate is destroyed. At this moment, the infrared light beam is reflected by a finger of the user and the infrared light beam is further transmitted into the infrared image capturing device. The conventional optical touch device then analyzes the infrared light image captured by the infrared light image capturing device to determine the position touched by the finger of the user. However, when the conventional optical touch device is used in an outdoor setting, an infrared light component in an ambient light beam tends to penetrate through the light guide plate to be transmitted into the infrared light image capturing device, causing a decreased reliability and sensitivity of the conventional optical touch device.

U.S. Patent Publication No. 20100302210 has disclosed a touch screen device including an infrared light source, a light guide plate, a bendable frustrating layer, an image detector and a projection source. U.S. Patent Publication No. 20080179507 has disclosed a multi-touch sensing device including a bendable layer, a light guide plate, an infrared light source, an image detector, and a projector. U.S. Patent Publication No. 20080284925 has disclosed a multi-touch sensing device including an infrared light emitter, a light guide board, a cover layer, an infrared light filter, and a liquid crystal panel.

SUMMARY

The invention provides a touch device having excellent reliability.

The invention provides a touch projection system having excellent reliability.

Other objects and advantages of the invention can be further understood by referring to the technical features disclosed in the invention.

To achieve one, part, or all of the objectives aforementioned or other objectives, an embodiment of the invention provides a touch device, including a light guide unit, a light emitting unit, an invisible light filter, and an invisible light detector. The light guide unit has at least one light incident surface and a first surface connected to the light incident surface. The light emitting unit is disposed beside the light incident surface and is capable of emitting an invisible light beam. The invisible light beam enters the light guide unit from the light incident surface and is transmitted in the light guide unit. The invisible light filter is contacted tightly with the first surface, and corresponds to a size of the first surface for blocking an ambient light beam from entering the touch device, wherein the ambient light beam has a wavelength distribution that substantially corresponds to a wavelength distribution of the invisible light beam, and the light guide unit is disposed between the invisible light filter and the invisible light detector.

Another embodiment of the invention provides a touch projection system including a projection unit, a screen and the touch device. The projection unit is capable of providing an image light beam. The screen is capable of receiving the image light beam. The touch device is disposed on a transmitting path of the image light beam.

In one embodiment of the invention, the screen is disposed between the projection unit and the light guide unit.

In one embodiment of invention, the invisible light filter is disposed between the projection unit and the screen.

In one embodiment of the invention, the screen is flexible.

In one embodiment of the invention, the screen has a second surface and a third surface opposite to each other. The third surface is disposed between the light guide unit and the second surface. The third surface is a rough surface.

In one embodiment of the invention, the screen has a second surface and a third surface opposite to each other. The second surface is disposed between the invisible light filter and the third surface. The second surface has a plurality of microstructures protruding toward the invisible light filter. The screen is supported on the invisible light filter through the protruding microstructures.

In one embodiment of the invention, the invisible light beam is an infrared light beam, and the invisible light detector is an infrared image capturing device.

In one embodiment of the invention, a plurality of optical films is laminated to form the invisible light filter.

In one embodiment of the invention, the touch device further includes at least one shading unit. The shading unit is disposed at an edge of the first surface. The invisible light filter is disposed between the shading unit and the first surface.

In one embodiment of the invention, the touch device further includes a flexible transparent substrate. The invisible light filter is disposed between the flexible transparent substrate and the first surface.

In one embodiment of the invention, the light guide unit and the invisible light filter is in a curved shape.

Based on the above description, the touch device and the touch projection system in one embodiment of the invention utilizes the invisible light filter to block an invisible light component of the ambient light beam from entering the touch projection system. Thereby, reliability and sensitivity of the touch device and the touch projection system of one embodiment of the invention are effectively improved.

To make the above features and advantages of the invention more comprehensible, several embodiments accompanied with drawings are described in detail as follows.

DETAILED DESCRIPTION OF DISCLOSED EMBODIMENTS

It is to be understood that both the foregoing and other detailed descriptions, features and advantages are intended to be described more comprehensively by providing an embodiment accompanied with figures hereinafter. The language used to describe the directions such as up, down, left, right, front, back or the like in the reference drawings is regarded as an illustrative rather than in a restrictive sense. Thus, the language used to describe the directions is not intended to limit the scope of the invention.

First Embodiment

Figure 1:
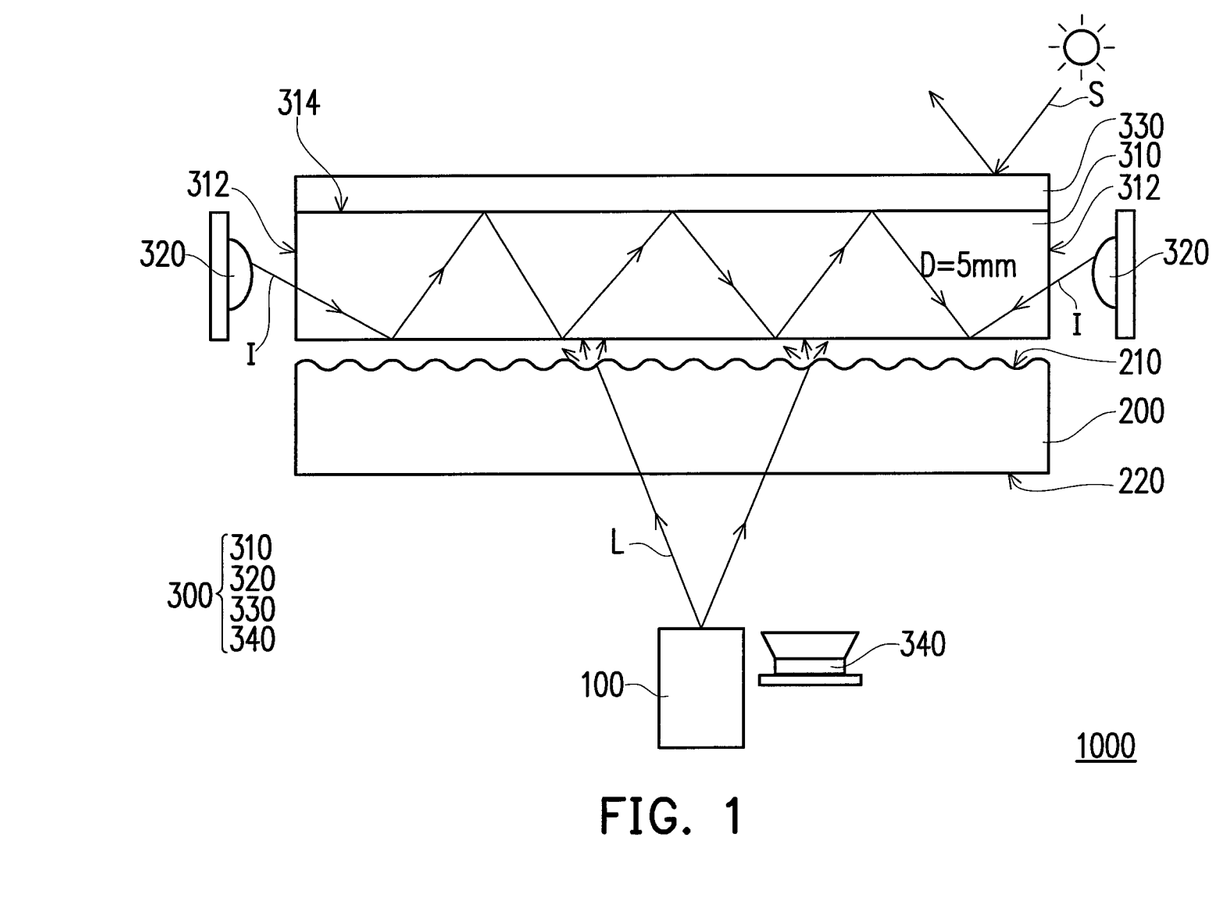
FIG. 1 is a schematic diagram illustrating a touch projection system according to a first embodiment of the invention.

FIG. 1 is a schematic diagram of a touch projection system according to a first embodiment of the invention. Referring to FIG. 1, a touch projection system 1000 of this embodiment includes a projection unit 100, a screen 200, and a touch device 300. The projection unit 100 is capable of providing an image light beam L. The image light beam L is a light beam carrying image information and visible for eyes of human beings. The screen 200 is disposed on a transmitting path of the image light beam L and is used to receive the image light beam L. In this embodiment, the screen 200 is disposed between the projection unit 100 and a light guide unit 310 of the touch device 300, wherein the light guide unit 310 is a transparent unit. The screen 200 of this embodiment has two surfaces 210 and 220 opposite to each other. The surface 210 is disposed between the surface 220 and the light guide unit 310. The surface 210 may be a rough surface, such that the image light beam L transmitted to the screen 200 scatters from the surface 210, allowing users viewing from different orientations to see an image displayed on the screen 200 at the same time.

The touch device 300 is disposed on the transmitting path of the image light beam L. The touch device 300 includes the light guide unit 310, a light emitting unit 320, an invisible light filter 330, and an invisible light detector 340. The light guide unit 310 has at least a light incident surface 312 and a first surface 314 connected to the light incident surface 312. The light emitting unit 320 is disposed beside the light emitting surface 312 and is capable of emitting an invisible light beam I into the light guide unit 310, wherein the invisible light beam I is a light beam that cannot be observed by eyes of human beings. The invisible light beam I may enter the light guide unit 310 from the light incident surface 312 and be transmitted within the light guide unit 310. More specifically, a reflection index of the light guide unit 310 (e.g. 1.52) may be higher than the reflection index of air (e.g. 1), which allows a total internal reflection of the invisible light beam I on an interface between the light guide unit 310 and air and enables a transmission in the light guide unit 310 by total internal reflection. In this embodiment, the invisible light beam I is, for example, an infrared light beam. A wavelength of the infrared light beam ranges between 800 nm-1100 nm. However, the invention is not limited thereto.

Figure 2:
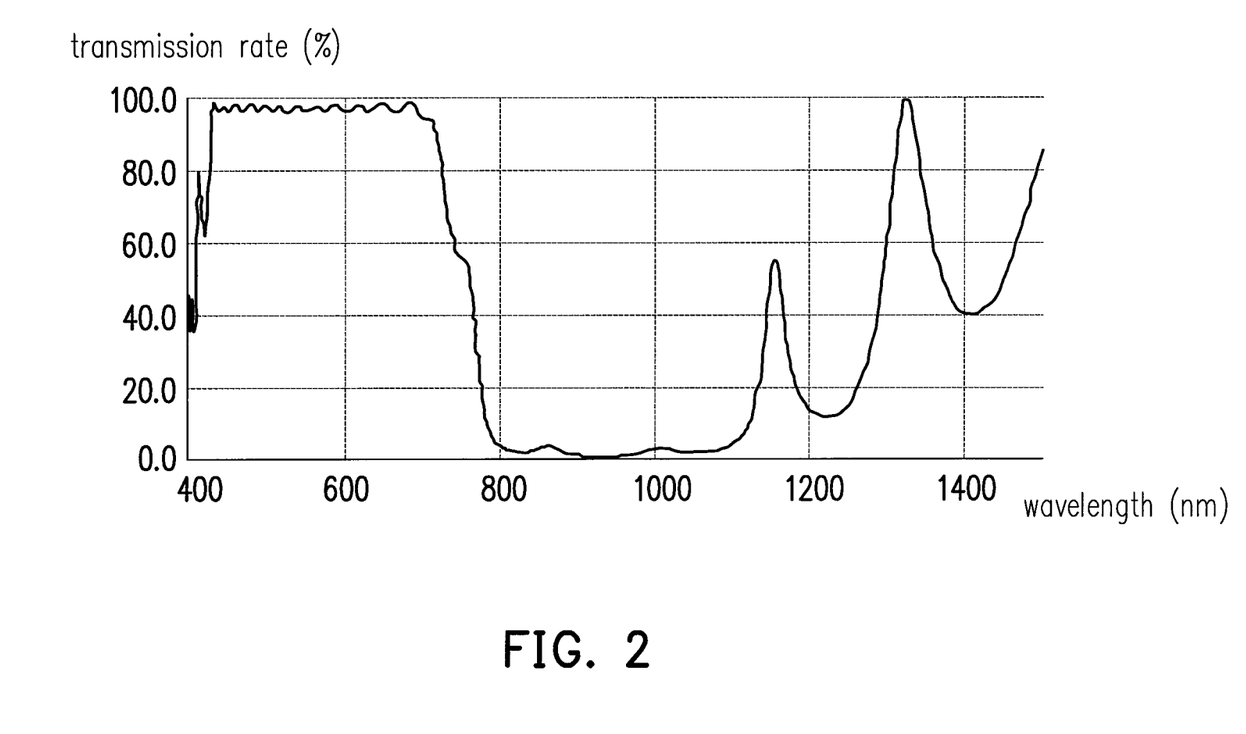
FIG. 2 illustrates a transmission rate of the invisible light filter in FIG. 1 to a spectrum of an ambient light beam.

In this embodiment, the invisible light filter 330 is contacted tightly with the first surface 314, and a size of the invisible light filter 330 corresponds to a size of the first surface 314. The light guide unit 310 is disposed between the invisible light filter 330 and the invisible light detector 340. In this embodiment, the invisible light detector 340 is, for example, an infrared light image capturing unit, wherein the infrared light image capturing unit is capable of converting an infrared light beam into an electrical signal. In this embodiment, a plurality of optical films are laminated to form the invisible light filter 330, and can be penetrated by the image light beam L projected by the projection unit 100 to the screen 200. Thereby the user is able to see the image displayed on the screen 200. FIG. 2 illustrates a transmission rate of the invisible light filter in FIG. 1 to a spectrum of an ambient light beam. As FIG. 2 illustrates, an ambient light beam S with a wavelength between 800 nm to 1100 nm cannot penetrate through the invisible light filter 330. In other words, as shown in FIG. 1, the ambient light beam S with the wavelength between 800 nm to 1100 nm is reflected by the light invisible filter 330 and hardly enters the invisible light detector 340. Thereby, the problem in the known art that the ambient light beam S is prone to influence the reliability and sensitivity of a touch device can be improved.

Figure 3:
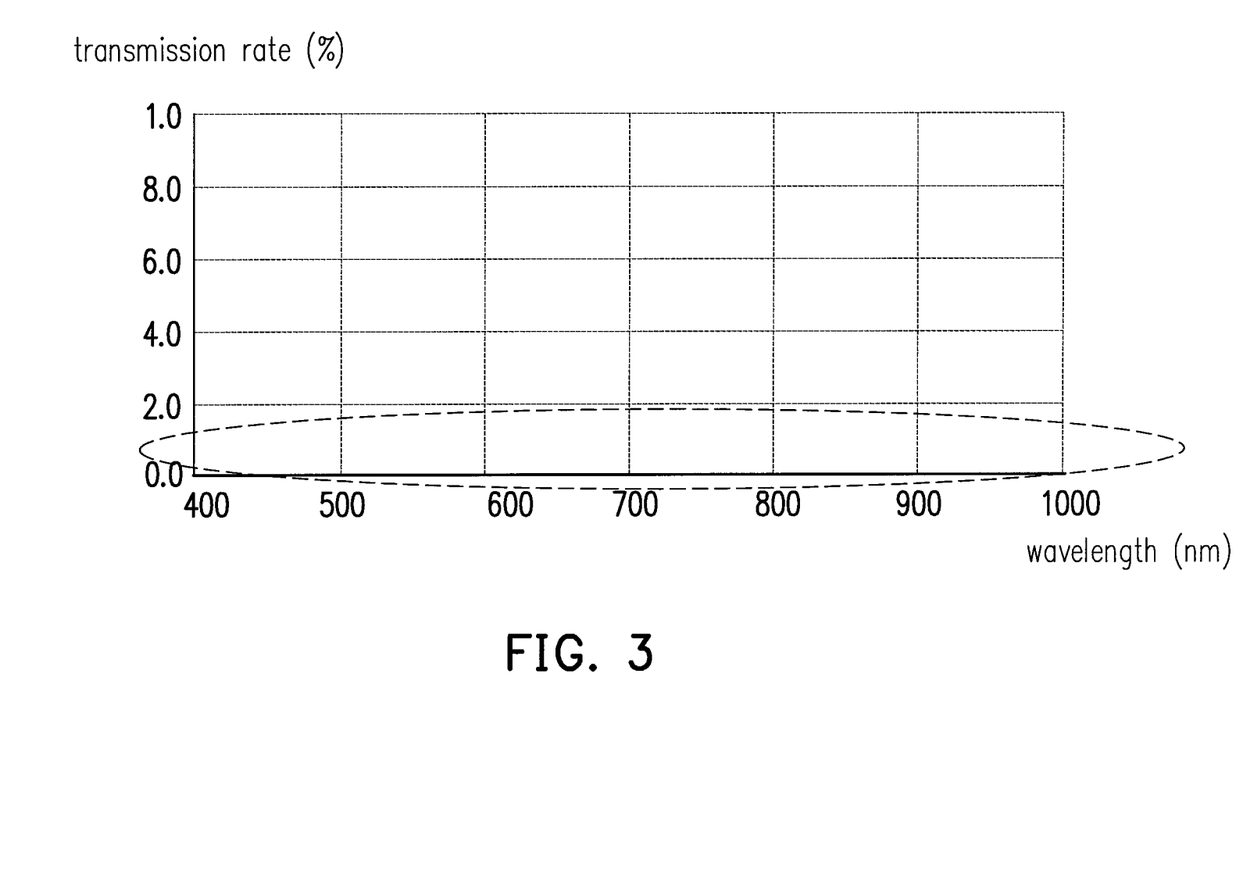
FIG. 3 illustrates a spectrum distribution detected by an invisible light detector at an opposite side of the first surface of the light guide unit in FIG. 1.

FIG. 3 illustrates a spectrum distribution detected by the invisible light detector at an opposite side of the first surface of the light guide unit in FIG. 1. By observing FIGS. 1 and 3, it can be known that when the touch projection system 1000 is exposed under the ambient light beam S and the user does not touch the touch device 300, the first surface 314 of the light guide unit 310 and the invisible light filter 330 are in tight contact, and a light beam with a wavelength between 400 nm to 1000 nm is hardly detected by the invisible light detector 340 at the opposite side of the first surface 314 of the light guide unit 310. In other words, due to functioning of the invisible light filter 330, the ambient light beam S with the wavelength between 800 nm to 1100 nm hardly enters to invisible light detector 340 to influence the performance of the touch projection system 1000, and a visible light with the wavelength 400 nm to 800 nm is blocked by a visible light-filtering unit (not shown) in the invisible light detector 340 and is detected.

Figure 4:
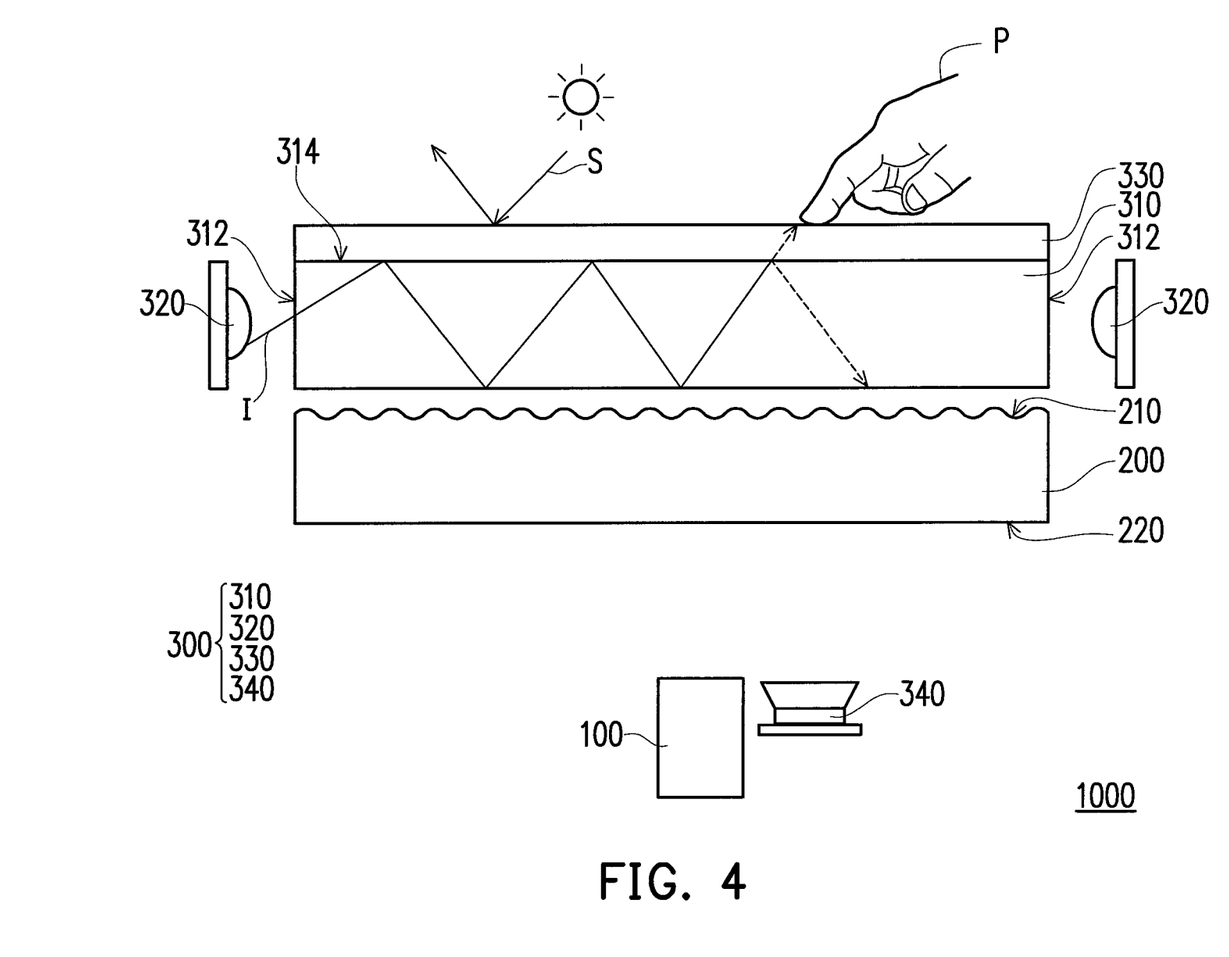
FIG. 4 illustrates a situation in which the touch projection system of FIG. 1 is touched by a user.

FIG. 4 illustrates a situation in which the touch projection system in FIG. 1 is touched by a user. Please refer to FIG. 4, when a user P touches the invisible light filter 330 of the touch device 300, the total internal reflection of the invisible light beam I in the light guide unit 310 corresponding to a touched position by the user P in the invisible light filter 330 is destroyed. In other words, when the total internal reflection of the invisible light beam I of the light guide unit 310 corresponding to the position touched by the user P at the invisible light filter 330 is destroyed, the invisible light beam I is transmitted through the invisible light filter 330 to the touched position by the user P and scatters due to the user P. In this way, the invisible detector 340 detects that the touched position contacted by the user P has a higher intensity of the invisible light beam I, and further computes the touched position contacted by the user P.

Figure 5:
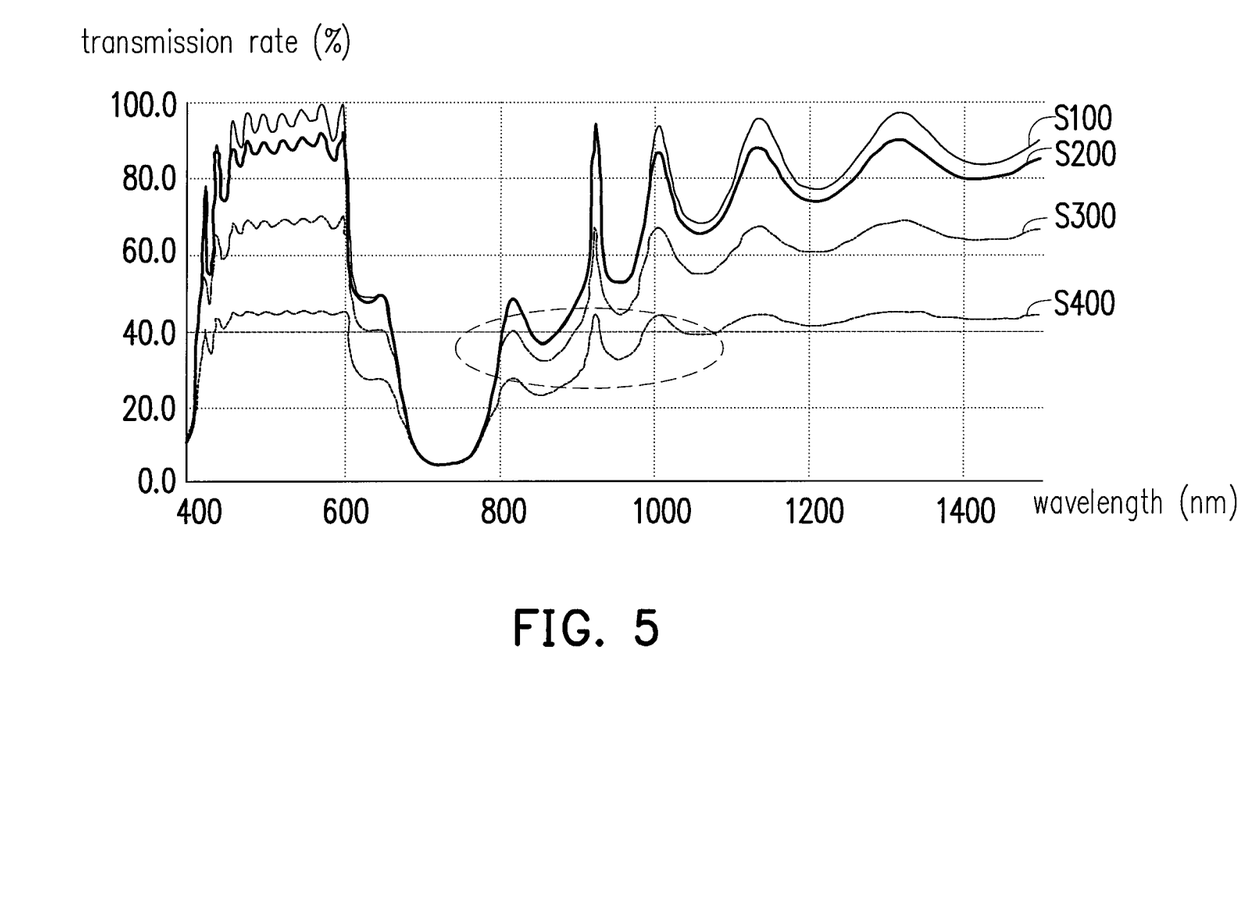
FIG. 5 illustrates a spectrum distribution detected at an opposite side of the first surface of the light guide unit in FIG. 4.

FIG. 5 illustrates a spectrum distribution detected on a surface at the opposite side of the first surface of the light guide unit in FIG. 4. Referring to FIGS. 4 and 5, a curved line S100 represents a spectrum distribution detected on a surface at the opposite side of the first surface 314 of the light guide unit 310 when a refraction index at the touched position of the invisible light filter 330 touched by the user P is 1.5, a curved line S200 represents a spectrum distribution detected on the surface at the opposite side of the first surface 314 of the light guide unit 310 when the refraction index at the touched position of the invisible light filter 330 touched by the user P is 2.5, a curved line S300 represents a spectrum distribution detected on the surface at the opposite side of the first surface 314 of the light guide unit 310 when the refraction index at the touched position of the invisible light filter 330 touched by the user P is 5, and a curved line S400 represents a spectrum distribution detected on the surface at the opposite side of the first surface 314 of the light guide unit 310 when the refraction index at the touched position of the invisible light filter 330 touched by the user P is 10. By comparing between FIGS. 3 and 5, it can be known that when the user P touches the invisible light filter 330, the invisible light beam I originally transmitted in the light guide unit 310 is transmitted to a side in which the invisible light detector 340 is disposed after the total internal reflection of the invisible light beam I is destroyed by the user P. The invisible light beam I can further be detected by the invisible light detector 340. By using change of intensity of invisible light beam I detected by the invisible light detector 340, the touched position touched by the user P can be computed.

Moreover, the light guide unit 310 and the invisible light filter 330 illustrated in FIGS. 1 and 4 are in a shape of plate. However, the invention is not limited thereto. In other embodiments, the light guide unit 310 and the invisible light filter 330 may be in a curve shape (not shown), wherein the invisible light filter 330 may be bent with the first surface 314 of the light guide unit 310. In this setting, the invisible light filter 330 also has the function of blocking the ambient light beam S with the wavelength of infrared light, which renders an excellent touch performance of the touch device 300.

Figure 6:
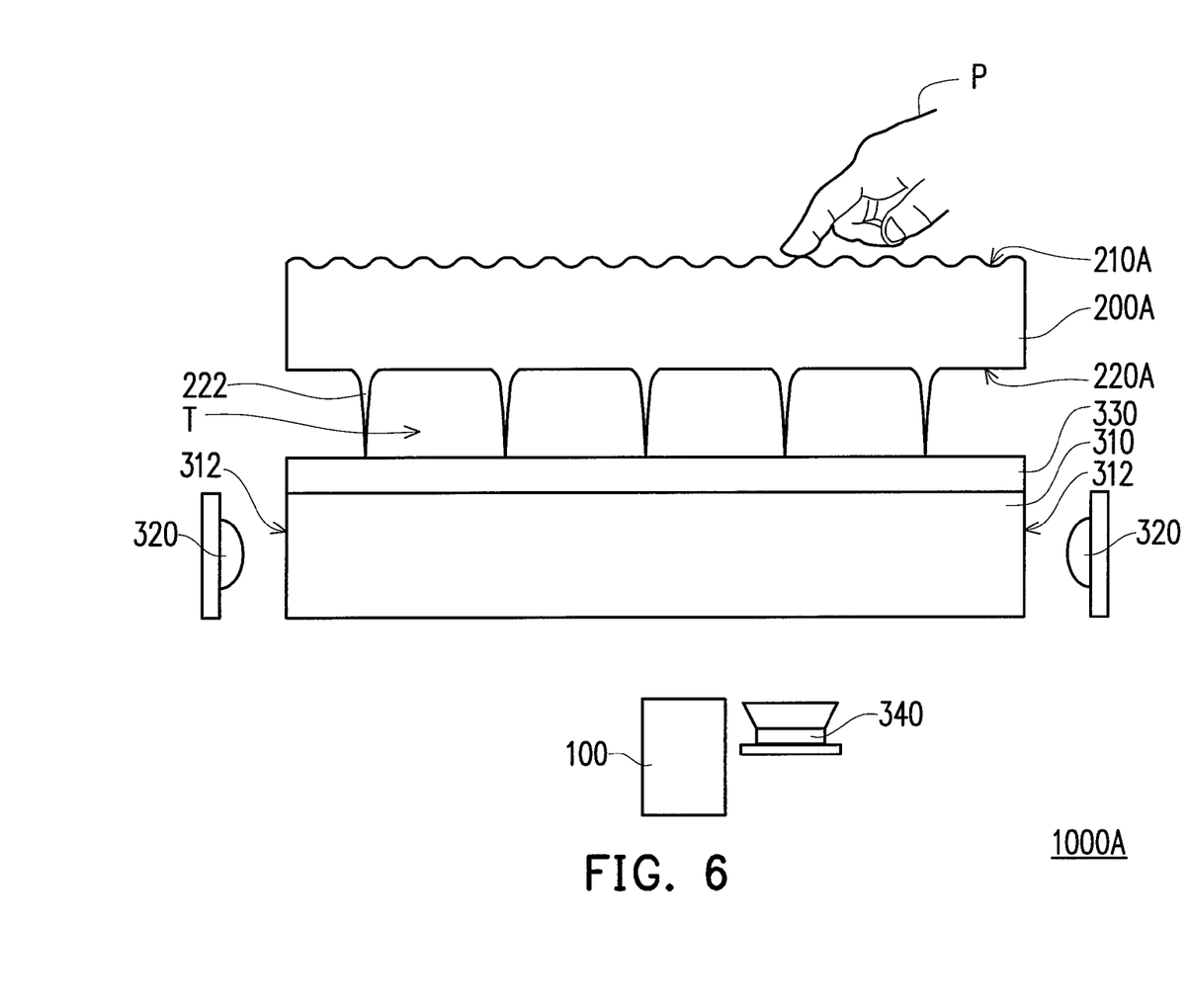
FIG. 6 is a schematic diagram illustrating a touch projection system according to another embodiment of the invention.

In addition, it should be noted that in a display device of the touch projection system of the invention, a position of the screen is not limited to the position illustrated in FIGS. 1 and 4. The screen may also be disposed in a different position in other embodiments. Please refer to the description below with reference to FIG. 6. FIG. 6 is a schematic diagram of a touch projection system according to another embodiment of the invention. Referring to FIG. 6, a touch projection system 1000A of this embodiment is similar to the touch projection system 1000 illustrated in FIGS. 1 and 4. Therefore, like numbers are used to refer to like elements. The touch projection system 1000A differs from the touch projection system 1000 in that a position and structure of a screen 200A and a position and structure of the screen 200 are different. More specifically, in the touch projection system 1000A, the invisible light filter 330 and the light guide unit 330 is disposed between the projection unit 100 and the screen 200A. The screen 200A has two opposite surfaces 210A and 220A. The surface 220A is disposed between the surface 210A and the invisible light filter 330. The surface 210A may be a rough surface. The surface 220A has a plurality of microstructures 222 protruding toward the invisible light filter 330 from the screen 200A, and the plurality of microstructures 220 protruding toward the invisible light filter 330 are disposed to be spaced apart from each other. The screen 200A is supported on the invisible light filter 330 through the plurality of microstructures 222. Moreover, a gap T is formed between the screen 200A and the invisible light filter 330.

It should be noted that the screen 200A of this embodiment may have a property of flexibility. When the user P intends to touch the touch projection system 1000A, the user P may press the screen 200A to deform the screen 200A to further contact with the invisible light filter 330. Since the screen 200A has an excellent flexibility, a portion of the screen 200A pressed by the user P may be in tight contact with the invisible light filter 330, such that the touch projection system 1000A has an even better touch performance.

Second Embodiment

Figure 7:
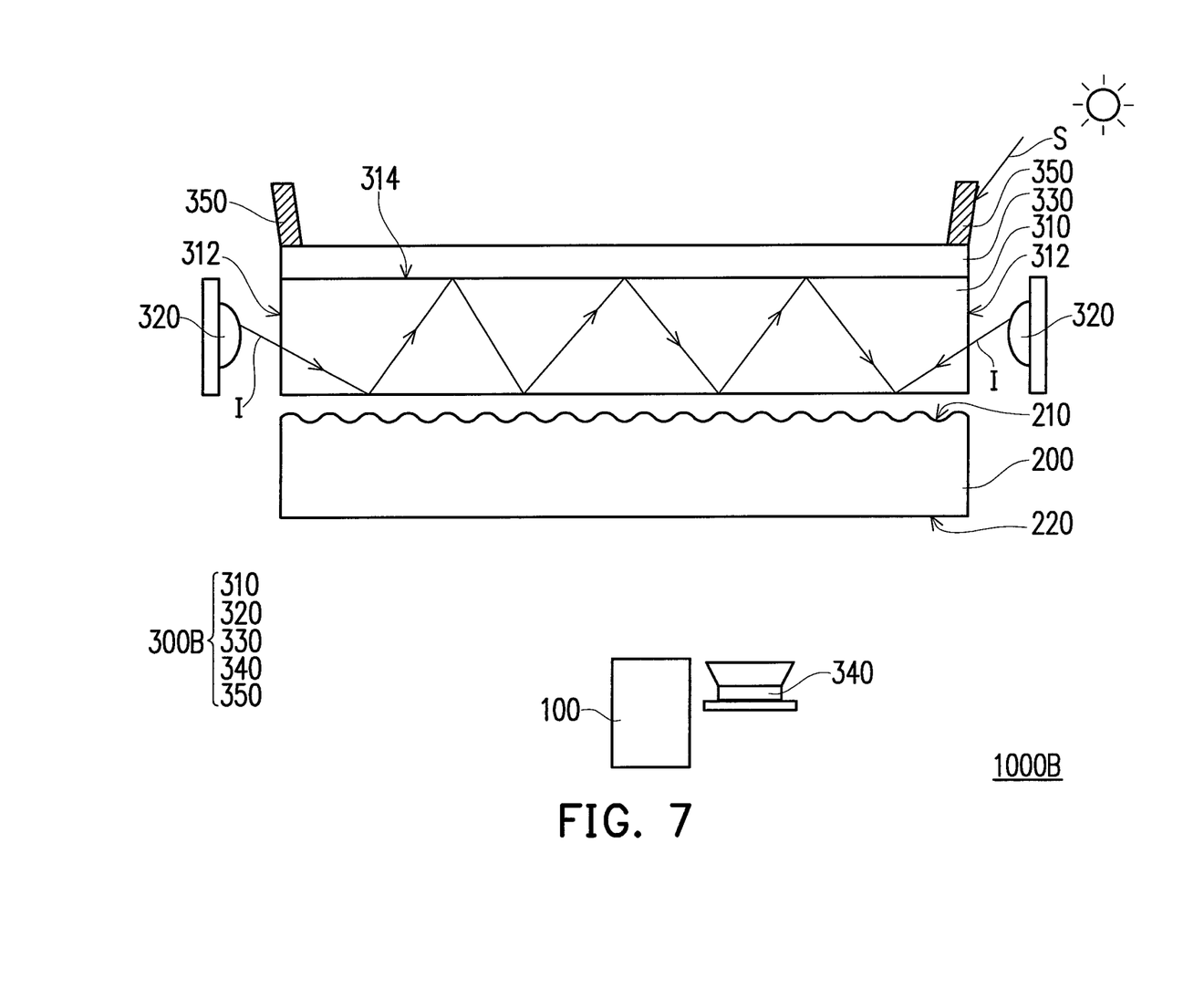
FIG. 7 is a schematic diagram illustrating a touch projection system according to a second embodiment of the invention.

FIG. 7 is a schematic diagram of a touch projection system according to a second embodiment of the invention. Referring to FIG. 7, a touch projection system 1000B is similar to the touch projection system 1000 illustrated in FIG. 1 or 4. Therefore, like numbers are used to refer to like elements. The touch projection system 1000B differs from the touch projection system 1000 in that a touch device 300B of the touch projection system 1000B further includes a shading unit 350. The difference is described in detail below, whereas similarities will not be reiterated below.

In the touch projection system 1000B of the embodiment, the touch device 300B may further include at least one of the shading unit 350. The shading unit 350 is disposed at an edge of the first surface 314 of the light guide unit 310. The invisible light filter 330 is disposed between the shading unit 350 and the first surface 314. For the concern of cost, a material of the invisible light filter 330 may be a material of normal quality. However, when the ambient light beam S is emitted into the invisible light filter 330 at a larger incident angle (e.g. 70 degrees), the ambient light beam S at some wavelength bands may penetrate through the invisible light filter 330 and influence performance of the projection system 1000B. However, with a shading effect of the shading unit 350, the ambient light beam S at the larger incident angle may be blocked out of the invisible light filter 330 by the shading unit 350, which enables the touch projection system 1000B to be of low cost and excellent performance. In addition, the touch projection system 1000B of this embodiment has advantages and efficiency similar to the touch projection system 1000, which will not be reiterated herein.

The Third Embodiment

Figure 8:
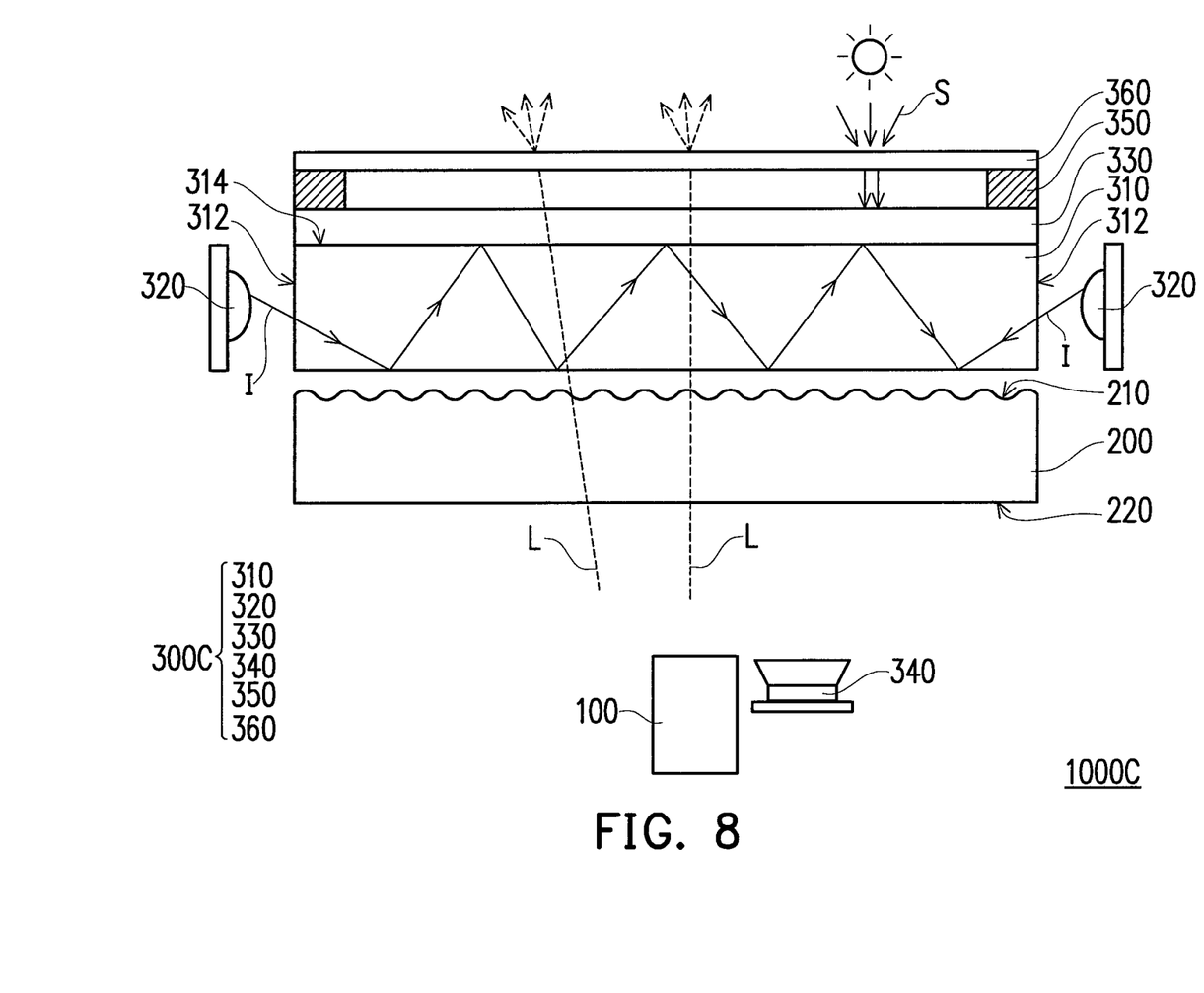
FIG. 8 is a schematic diagram illustrating a touch projection system according to a third embodiment of the invention.

FIG. 8 is a schematic diagram of a touch projection system according to a third embodiment of the invention. Referring to FIG. 8, a touch projection system 1000C is similar to the touch projection system 1000B of the second embodiment. Therefore, like numbers are used to refer to like elements. The touch projection system 1000C and the touch projection system 1000B differ in that the touch device 300C of the touch projection system 1000C further includes a flexible transparent substrate 360. The difference between the two embodiments will be described in detail below, whereas similarities will not be reiterated.

In the touch projection system 1000C of this embodiment, the touch device 300C may further include the flexible transparent substrate 360. The invisible light filter 330 is disposed between the flexible transparent substrate 360 and the first surface 314 of the light guide unit 310. More specifically, the flexible transparent substrate 360 is fixed on the shading unit 350, whereas there may be a gap between the flexible transparent substrate 360 and the invisible light filter 330. It should be noted that the flexible transparent substrate 360 enables the ambient light beam S to be emitted into the invisible light filter 330 at a smaller incident angle, such that the invisible light filter 330 may effectively block an invisible light component in the ambient light beam S to improve performance of the touch projection system 1000C. In addition, the image light beam L may leave the touch projection system 1000C at a larger emergent angle through the flexible transparent substrate 360. Thereby, the user may see an image in a wide view.

Figure 9:
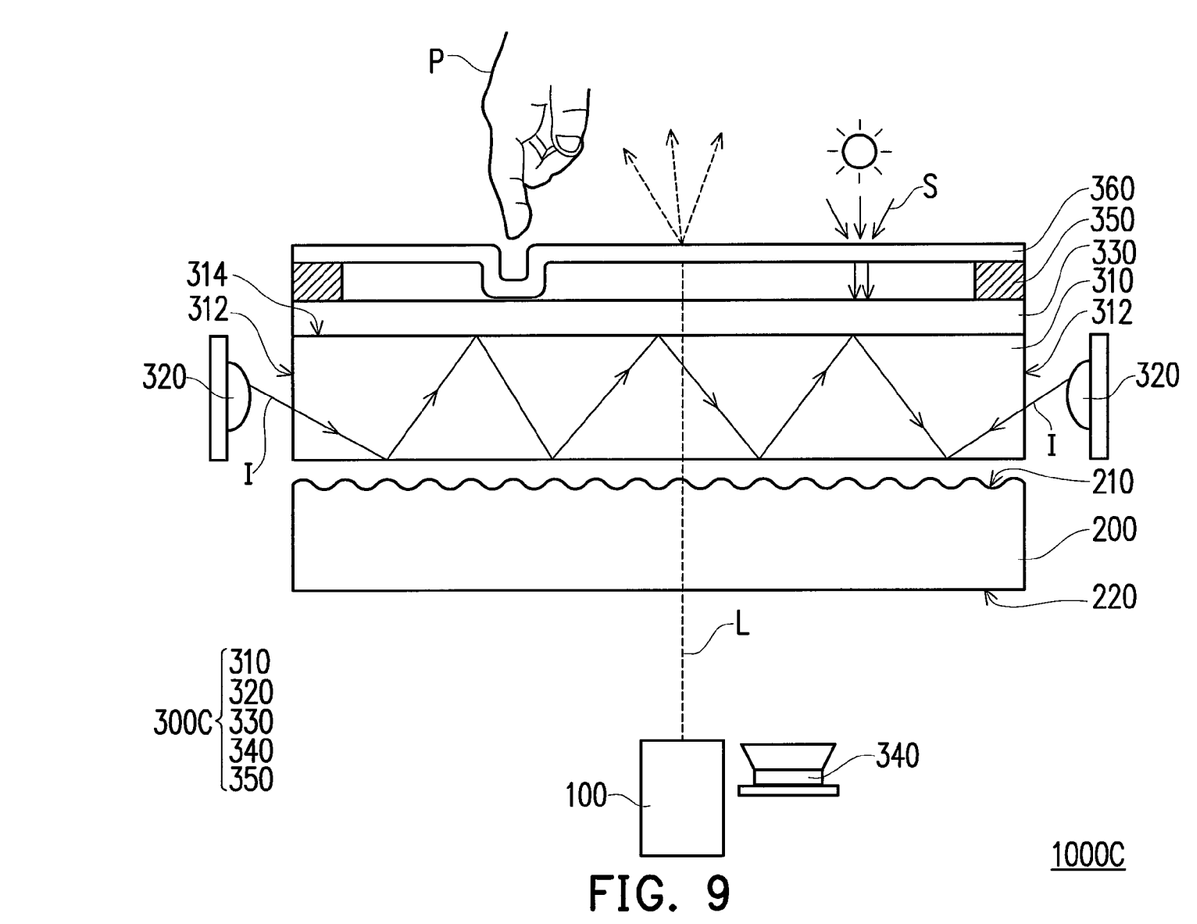
FIG. 9 illustrates a situation in which the touch projection system illustrated in FIG. 8 is touched by a user.

FIG. 9 illustrates a situation in which the touch projection system illustrated in FIG. 8 is touched by a user. Referring to FIG. 9, when the user P intends to touch the touch projection system 1000C, the user P may press the flexible transparent substrate 360 to deform the flexible transparent substrate 360, such that the flexible transparent 360 contacts with the invisible light filter 330. Since the flexible transparent substrate 360 has the property of excellent flexibility, a portion of the flexible transparent substrate 360 pressed by the user P is in tight contact with the invisible light filter 330. Thereby, the touch projection system 1000C has an excellent touch performance. In addition, the touch projection system 1000C of this embodiment has advantages and efficiency similar to the touch projection system 1000B, which will not be reiterated herein.

Figure 10:
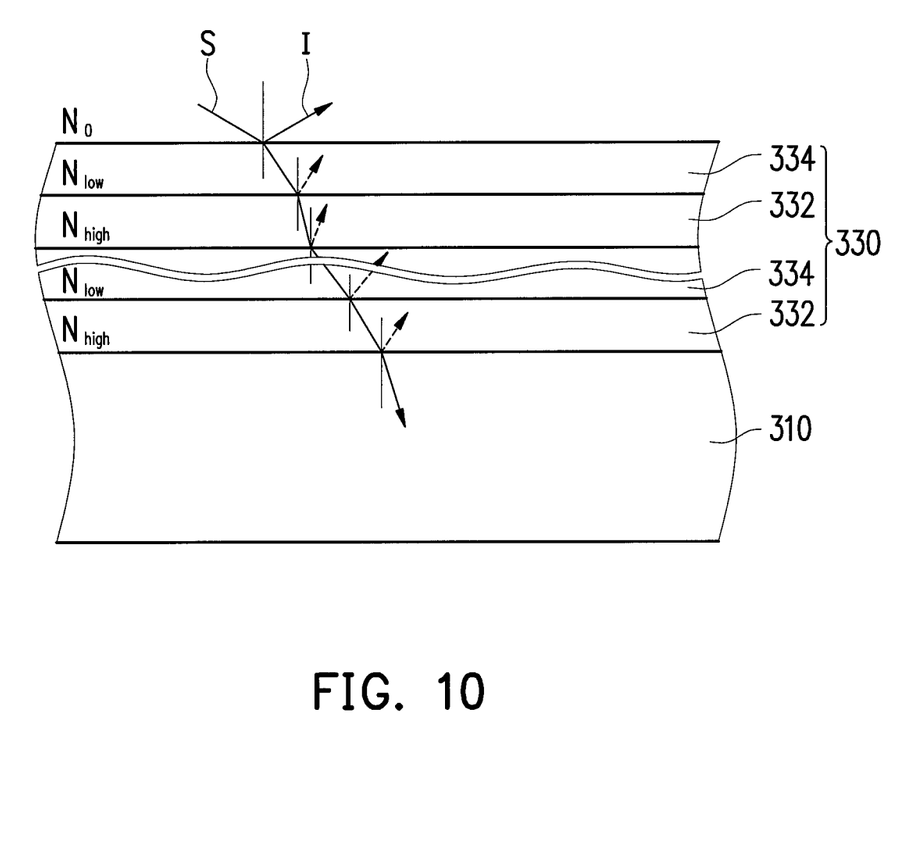
FIG. 10 is a schematic diagram of the invisible light filter according to an embodiment of the invention.

FIG. 10 is a schematic diagram of the invisible light filter according to an embodiment of the invention. Referring to FIG. 10, a plurality of optical films are laminated to form the invisible light filter 330. The invisible light filter 330 is in tight contact with the light guide unit 310. In this setting, the invisible light filter 330 is formed by repetitively stacking an optical film having a high reflection index 332 with an optical film having a low reflection index 334, wherein the high reflection index of the optical film 332 is $N_{high}$, the low reflection index of the optical film 334 is $N_{low}$, a reflection index of air is $N_0$. In the ambient light beam S, the light beam I with a wavelength of invisible light beam is emitted from air to the invisible light filter 330, penetrates through and is reflected at interfaces between every two adjacent optical films, such that a destructive interference of the light beam I with the wavelength of invisible light beam occurs due to a difference in light path and an intensity of penetrating light beam is reduced to minimum. Eventually, only a light beam in a wavelength of visible light (not shown) in the ambient light beam S can be transmitted through the invisible light filter 330 to the light guide unit 310.

Based on the above, the touch device and the touch projection system according to an embodiment of the invention utilizes the invisible light filter to prevent the invisible light beam in the ambient light beam from entering the invisible light detector. Thereby, the touch device and touch projection system according to an embodiment of the invention has an improved reliability and sensitivity.

The touch device and touch projection system according to another embodiment of the invention utilizes the shading unit to prevent the ambient light beam with a larger incident angle from penetrating through the invisible light filter, so as to lower a probability that the invisible light component in the ambient light beam is transmitted to the invisible light detector. In this way, the touch device and touch projection system according to another embodiment of the invention has an excellent performance.

In addition, in the touch device and touch projection system according to another embodiment of the invention, the user can press the invisible light filter through the flexible transparent substrate. Since the flexible transparent substrate has an excellent flexibility, the portion of the flexible transparent substrate pressed by the user may be in tight contact with the invisible light filter. Thereby, the touch device and the touch projection system have an excellent touch performance.

The embodiments described above are preferable embodiments of the invention. It is not intended to use the embodiments to limit the scope of the invention. Any simple and equivalent variation or modification based on the scope of claims and specification of the invention still falls within the scope of the invention. In addition, each of the embodiments or claims of the invention needs not to cover all of the objectives, advantages, or features of the invention. Moreover, the abstract and the headings are merely for the convenience of searching through the document and are not intended to limit the scope of the claims of the invention. In addition, terms like first, second, third, etc., such as the first surface, are used to represent elements instead of setting an upper or lower limit on the quantity of elements.

What is claimed is:

1. A touch device, comprising:
   a light guide unit having at least one light incident surface and a first surface connected to the light incident surface;
   a light emitting unit disposed beside the light incident surface and capable of emitting an invisible light beam, wherein the invisible light beam enters the light guide unit from the light incident surface and is transmitted in the light guide unit;
   an invisible light filter contacted tightly with the first surface, corresponding to a size of the first surface, and capable of blocking an ambient light beam from entering the touch device, wherein the ambient light beam has a wavelength distribution which substantially corresponds to a wavelength distribution of the invisible light beam;
   an invisible light detector capable of detecting the invisible light beam, and the light guide unit disposed between the invisible light filter and the invisible light detector; and
   at least one shading unit located above and at an edge of the first surface without contacting physically the light emitting unit, and the invisible light filter is disposed between the shading unit and the first surface, wherein the shading unit is directly contacted with the invisible light filter.

2. The touch device as claimed in claim 1, wherein the invisible light beam is an infrared light beam, and the invisible light detector is an infrared light image capturing unit.

3. The touch device as claimed in claim 1, further comprising:
   a flexible transparent substrate, wherein the invisible light filter is disposed between the flexible transparent substrate and the first surface.

4. The touch device as claimed in claim 1, wherein the light guide unit and the invisible light filter are in a curve shape.

5. The touch device as claimed in claim 1, wherein a transmission rate of the invisible light filter of the ambient light beam with the wavelength distribution between 800 nm and 1100 nm is substantially zero, and a transmission rate of the invisible light filter of visible light is substantially 100%.

6. A touch projection system, comprising:
a projection unit capable of providing an image light beam to a screen and;
a touch device disposed on a transmitting path of the image light beam, comprising:
   a light guide unit having at least one light incident surface and a first surface connected to the light incident surface;
   a light emitting unit disposed beside the light incident surface and capable of emitting an infrared light beam, wherein the infrared light beam enters the light guide unit from the light incident surface and is transmitted in the light guide unit;
   an invisible light filter contacted tightly with the first surface, corresponding to a size of the first surface, and capable of blocking an ambient light beam from entering the touch device, wherein a plurality of optical films are laminated to form the invisible light filter, wherein the ambient light beam has a wavelength distribution, which substantially corresponds to a wavelength distribution of the infrared light beam, a transmission rate of the infrared light beam detected on a surface at the opposite side of the first surface of the light guide unit ranges between substantially 30% and 50% when a user touches the invisible light filter; and
   an invisible light detector capable of detecting the infrared light beam, the light guide unit disposed between the invisible light filter and the invisible light detector.

7. The touch projection system as claimed in claim 6, wherein the screen is disposed between the projection unit and the light guide unit.

8. The touch projection system as claimed in claim 6, wherein the invisible light filter is disposed between the projection unit and the screen.

9. The touch projection system as claimed in claim 8, wherein the screen is flexible.

10. The touch projection system as claimed in claim 8, wherein the screen has a second surface and a third surface opposite to each other, and the second surface is disposed between the invisible light filter and the third surface, wherein the third surface is an rough surface, the second surface has a plurality of microstructures protruding toward the invisible light filter, and the screen is supported on the invisible light filter through the microstructures.

11. The touch projection system as claimed in claim 6, wherein the screen has a second surface and a third surface opposite to each other, and the third surface is disposed between the light guide unit and the second surface, wherein the third surface is a rough surface.

12. The touch projection system as claimed in claim 6, wherein the invisible light detector is an infrared light image capturing device.

13. The touch projection system as claimed in claim 6, wherein the touch device further comprises:
at least one shading unit located above and at an edge of the first surface without contacting physically the light emitting unit, and the invisible light filter is disposed between the shading unit and the first surface.

14. The touch projection system as claimed in claim 6, wherein the touch device further comprises:
a flexible transparent substrate, and the invisible light filter is disposed between the flexible transparent substrate and the first surface.

15. The touch projection system as claimed in claim 6, wherein the light guide unit and the invisible light filter are in a curve shape.

* * * * *